Sept. 25, 1923.
R. B. POLK
SEGMENTING TOOL FOR CITRUS FRUIT
Filed Jan. 24, 1923
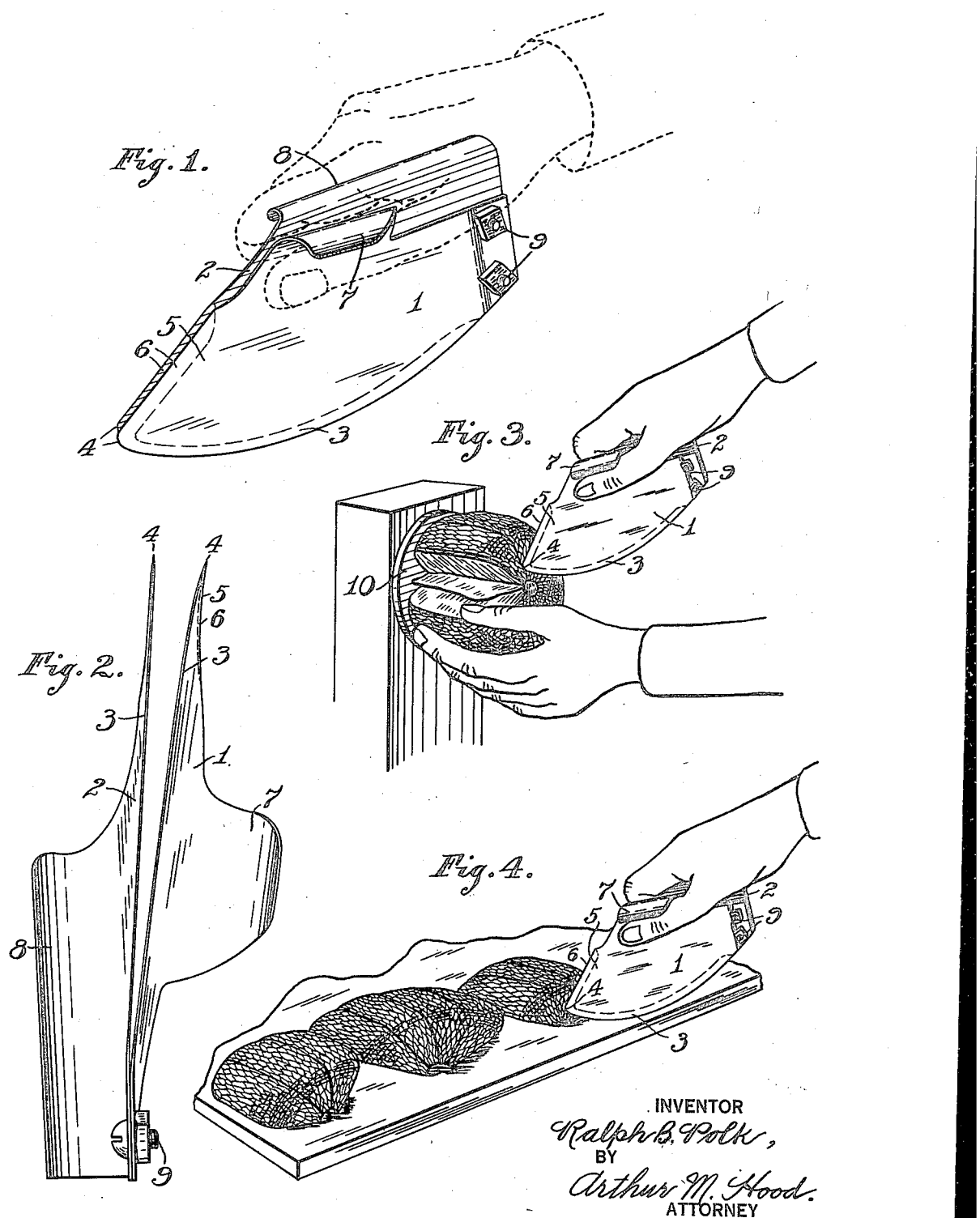
INVENTOR
Ralph B. Polk,
BY
Arthur M. Hood.
ATTORNEY Patented Sept. 25, 1923.

1,468,648

UNITED STATES PATENT OFFICE.

RALPH B. POLK, OF GREENWOOD, INDIANA.

SEGMENTING TOOL FOR CITROUS FRUIT.

Application filed January 24, 1923. Serial No. 614,713.

*To all whom it may concern:*

Be it known that I, RALPH B. POLK, a citizen of the United States, residing at Greenwood, in the county of Johnson and State of Indiana, have invented a new and useful Segmenting Tool for Citrous Fruit, of which the following is a specification.

My invention relates to improvement in implements for operating upon citrous fruits and has for one of its objects the provision of means for separating the pulp segments of citrous fruits from the skin or rag which is interposed between the segments.

My invention is particularly adapted for use in preparing grape fruit for canning. As is well known, the grape fruit core has radiating therefrom, fibrous layers of skins, or rags, between which the pulp segments are arranged. In preparing this fruit, both for the table and for canning, it is desirable in the one instance and necessary in the other to remove this rag. In the canning industry it is desirable that the pulp segments be removed with as little tearing as possible and they should be removed in whole sections or segments. It is one of the objects of my invention to provide an implement which will permit the rapid and easy separation of the rag from the segments without tearing or breaking up the segments.

For the purpose of disclosing my invention I have illustrated one embodiment of the same in the accompanying drawings in which, Fig. 1 is a perspective view of my implement;

Fig. 2 is a bottom plan view;

Fig. 3 is a perspective view showing one manner of using the implement, and

Fig. 4 is a perspective view showing another manner of using the implement.

As illustrated, the implement comprises a pair of substantially parallel blades, 1 and 2, each of which is provided with an arcuate sharpened edge 3 and each of which terminates at its front in a blunt nose 4 slightly rounded and sharpened. The back of the blade, from the nose, inclines upwardly as at 5 and is also sharpened as at 6 so as to present at the front a more or less pointed blade, sharpened on its upper and lower edges. I have found that better results are obtained by producing a ground edge on the implement instead of sharpening the same by a whetstone or like method, as by grinding, innumerable small saw teeth are formed which materially assist in the cutting action of the implement. The blade 1 has on its back a portion thereof curved outwardly and downwardly to form a thumb grip 7 which grip is toward the front of the blade leaving the rear portion unobstructed. The back of the opposite blade is curved of flared outwardly and downwardly to provide a finger grip 8 and it will be noted that this grip conveniently extends to the rear of the blade. Each blade is formed of resilient metal and the blades are separately secured together at their rear ends by means of bolts or other securing means 9. The blades are sprung apart slightly toward their forward ends so that the blades will be slightly separated as shown, or if desired, a separator may be interposed between the two blades at the point where they are fastened together so that the blades will be spaced apart from one another.

One method of use of the implement is illustrated in Fig. 3. The grape fruit is first peeled, the peeling and with it the inner skin, being removed to fully expose the pulp segments. The fruit is preferably mounted upon the prongs of a rotatable disk 10 as shown and the operator grasps the implement in his hand, the fingers hooking over the finger grip 8 and the thumb being inserted under the thumb grip 7. This enables the operator, by means of his thumb and fingers to move the two blades toward one another leaving only sufficient space between them to accommodate the rag, and at the same time permits a firm grip on the implement. The implement is then shoved forward with the blades straddling the rag and the pulp on either side of the rag is cut loose therefrom. After the first cut is made the fruit is rotated and the next rag is treated in the same manner. This leaves the pulp segments entirely separated from the rag but still attached at its apex to the core. A very slight pressure, however, of the fore finger and thumb at each end of the segment releases the segment from the core and it may then be lifted out and placed to one side.

In Fig. 4 I have illustrated another method of using my implement. By this method the core is first removed, preferably by a tubular cutting instrument having a sharpened edge, after which the fruit is laid out on the table as illustrated and the rag removed in much the same manner as heretofore described. After the complete cut has been made, by pinching the blades together the operator is enabled to grip the rag between the blades and withdraw the same from between the segments after which it may be dropped to one side by permitting the blades to again separate.

By forming the blades of spring material so that they will be sprung apart they can be moved together very readily and the spacing of the same controlled nicely for varying thicknesses of rag so that they will be spaced apart just sufficiently to straddle the rag.

Furthermore, by separably securing the blades together the blades can be separated from one another for grinding or sharpening purposes. It is apparent that the implement provides for the rapid separation of the pulp from the rag and cleanly cuts the pulp without tearing so that the pulp may be removed with a minimum amount of labor and a minimum amount of time.

I claim as my invention:

1. A segmenting implement for citrous fruits comprising a pair of parallel blades, each having a sharpened, arcuate, bottom cutting edge and a front edge, extending rearwardly and upwardly and sharpened to present a cutting nose, said blades being spaced apart to permit the same to straddle the rag of the fruit and cut the pulp therefrom on both sides of the rag in a single cutting operation.

2. A segmenting tool for citrous fruit comprising a pair of blades having sharpened cutting edges, said blades being spaced apart to straddle the rag of a fruit, the space between the blades being unobstructed and said blades being provided with finger grips on their opposite sides.

3. A segmenting tool for citrous fruit comprising a pair of wide blades having arcuate sharpened cutting edges and spaced apart to permit the blades to straddle the rag of the fruit, said blades having finger grips at the back edges thereof.

4. A segmental tool for citrous fruit comprising a pair of blades mounted in parallelism and suitably spaced apart, each blade having a curved lower cutting edge and having its back outwardly flared to form a finger grip.

5. A segmenting tool for citrous fruits comprising a pair of blades, each having a substantially V shaped nose sharpened on its top and bottom edge and means connecting the rear portion of said blades to hold the same suitably spaced apart with the space substantially unobstructed.

6. A segmenting tool for citrous fruit comprising a pair of cutting blades each blade having a substantially V shaped nose sharpened on both its top and bottom edge, said blades being secured together at their rear end only and being sprung apart from said securing point forwardly.

7. A cutting tool for citrous fruit comprising a pair of comparatively wide cutting blades, each blade having an arcuate cutting edge and a finger grip at its back, said blades being connected at their rear ends and held spaced apart, said space between the blades being substantially unobstructed.

8. A segmenting tool for citrous fruit comprising a pair of blades, each having a sharpened cutting edge and a finger grip at its back, said blades being connected together at their rear end to permit the blades to be spaced substantially throughout their length, the space between said blades being unobstructed.

In witness whereof I, RALPH POLK, have hereunto set my hand at Haines City, Florida.

RALPH B. POLK.